United States Patent
Harris et al.

(10) Patent No.: US 9,019,858 B2
(45) Date of Patent: Apr. 28, 2015

(54) GENERATING SHORT TERM BASE STATION UTILIZATION ESTIMATES FOR WIRELESS NETWORKS

(71) Applicant: Nokia Siemens Networks Oy, Espoo (FI)

(72) Inventors: John M. Harris, Glenview, IL (US); Sania Irwin, Glen Ellyn, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 88 days.

(21) Appl. No.: 13/774,123

(22) Filed: Feb. 22, 2013

(65) Prior Publication Data

US 2014/0241174 A1 Aug. 28, 2014

(51) Int. Cl.
| | |
|---|---|
| H04L 12/26 | (2006.01) |
| H04W 24/02 | (2009.01) |
| H04W 72/12 | (2009.01) |
| H04W 28/26 | (2009.01) |
| H04L 29/08 | (2006.01) |
| H04L 12/917 | (2013.01) |
| H04L 12/911 | (2013.01) |

(Continued)

(52) U.S. Cl.
CPC .............. *H04W 24/02* (2013.01); *H04W 28/12* (2013.01); *H04W 72/1257* (2013.01); *H04W 4/26* (2013.01); *H04L 43/0876* (2013.01); *H04W 28/26* (2013.01); *H04L 43/0888* (2013.01); *H04L 67/2847* (2013.01); *H04L 67/22* (2013.01); *H04L 47/76* (2013.01); *H04L 47/823* (2013.01); *H04L 47/822* (2013.01); *H04L 43/04* (2013.01)

(58) Field of Classification Search
None
See application file for complete search history.

(56) References Cited

U.S. PATENT DOCUMENTS

| | | | |
|---|---|---|---|
| 2004/0186877 A1 | 9/2004 | Wang et al. | 709/200 |
| 2004/0187136 A1* | 9/2004 | Bhogal et al. | 719/311 |

(Continued)

FOREIGN PATENT DOCUMENTS

| | | |
|---|---|---|
| EP | 2341732 A1 | 7/2011 |
| EP | 2266358 B1 | 5/2012 |

(Continued)

OTHER PUBLICATIONS

Cheluvaraju, et al.; "Anticipatory Retrieval and Caching of Data for Mobile Devices in Variable-Bandwidth Environments"; 2011 IEEE International; Systems Conference (SYSCON); Apr. 4, 2011; pp. 531-537.

(Continued)

*Primary Examiner* — Faruk Hamza
*Assistant Examiner* — Andrew Oh
(74) *Attorney, Agent, or Firm* — Harrington & Smith

(57) ABSTRACT

Monitoring within a network a history of bits throughput to a base station over each of a plurality of time intervals, monitoring within the network a physical resource block utilization level over each of the plurality of time intervals, determining a ratio of the history of bits to the utilization level for each of the plurality of time intervals, determining an updated history of bits for each of a plurality of upcoming time intervals, estimating an updated utilization level in response to the updated history of bits and the ratio, generating messaging to at least one additional network element conveying the estimated updated physical resource block utilization level, and adjusting at least one of a prefilling process or a prefetching process in response to the updated utilization level.

23 Claims, 5 Drawing Sheets

(51) Int. Cl.
*H04W 28/12* (2009.01)
*H04W 4/26* (2009.01)

(56) References Cited

U.S. PATENT DOCUMENTS

| | | | | |
|---|---|---|---|---|
| 2005/0171984 | A1* | 8/2005 | Wang et al. | 708/100 |
| 2006/0120282 | A1 | 6/2006 | Carlson et al. | |
| 2007/0280105 | A1 | 12/2007 | Barkay et al. | 370/229 |
| 2008/0225829 | A1* | 9/2008 | Sachs et al. | 370/351 |
| 2010/0110887 | A1 | 5/2010 | Beaujean et al. | |
| 2010/0235542 | A1 | 9/2010 | Visharam et al. | 709/246 |
| 2010/0254335 | A1 | 10/2010 | Koo et al. | |
| 2011/0225315 | A1 | 9/2011 | Wexler et al. | 709/231 |
| 2012/0030143 | A1* | 2/2012 | Chen et al. | 705/400 |
| 2012/0072678 | A1 | 3/2012 | Biswas et al. | 711/154 |
| 2012/0140726 | A1 | 6/2012 | Moon et al. | 370/329 |
| 2012/0147831 | A1 | 6/2012 | Golitschek | 370/329 |
| 2012/0170510 | A1 | 7/2012 | Kim et al. | 370/315 |
| 2012/0236752 | A1 | 9/2012 | Hu et al. | 370/252 |
| 2012/0238263 | A1 | 9/2012 | Caretti et al. | 455/426.1 |
| 2012/0238313 | A1* | 9/2012 | Zhou et al. | 455/522 |
| 2012/0331478 | A1* | 12/2012 | Zhu et al. | 718/104 |
| 2013/0153298 | A1 | 6/2013 | Pietraski et al. | 175/45 |
| 2013/0155966 | A1* | 6/2013 | Bekiares et al. | 370/329 |
| 2013/0282918 | A1 | 10/2013 | De Vleeschauwer et al. | 709/231 |
| 2013/0286873 | A1* | 10/2013 | Wilkinson et al. | 370/252 |
| 2013/0290493 | A1 | 10/2013 | Oyman et al. | 709/219 |
| 2013/0301539 | A1* | 11/2013 | Aguirre et al. | 370/329 |
| 2013/0326061 | A1* | 12/2013 | Li | 709/224 |
| 2014/0185452 | A1* | 7/2014 | Kakadia et al. | 370/236 |

FOREIGN PATENT DOCUMENTS

| | | |
|---|---|---|
| WO | WO-2010/101431 A2 | 9/2010 |
| WO | WO-2010/128668 A1 | 11/2010 |
| WO | WO-2011/063854 A1 | 6/2011 |

OTHER PUBLICATIONS

Nokia Siemens Networks; "Composite information on available resources for SON load balancing"; R3-091354; 3GPP TSG RAN WG3 Meeting #64; May 4-8, 2009, San Francisco, USA; whole document (3 pages).
3GPP TS 36.314 V11.0.0, "3rd Generation Partnership Project; Technical Specification Group Radio Access Network; evolved Universal Terrestrial Radio Access (E-UTRA); Layer 2-Measurements (Release 11)", Sep. 2012.
"Quality of Service Solutions in HSPA RAN", Nokia Siemens Networks, 2009, 18 pgs.
"LTE and WiMAX Comparison", Tejas Bhadare, pp. 16-19.
Motorola, 3GPP TSG-RAN Meeting #62, R1-105111, "Draft Change Request, 36.213 CR 9.2.0, Introduction of Rel-10 LTE-Advanced features in 36.213", Madrid, Spain, Aug. 23-27, 2010, 84 pages.

Alcatel Shanghai Bell et al., 3GPP TSG RAN WG1 Meeting #53bis R1-082501, "Collaborative MIMO for LTE-A downlink", Warsaw, Poland, Jun. 30-Jul. 4, 2008, 7 pages.
3GPP TS 36.211 V9.1.0, "3rd Generation Partnership Project; Technical Specification Group Radio Access Network; Evolved Universal Terrestrial Radio Access (E-UTRA); Physical Channels and Modulation (Release 9)", Mar. 2010, 85 pages.
Samsung, 3GPP TSG RAN WG1 Meeting #60, R1-101173, "Performance evaluation of CoMP CS/CB", San Francisco, USA, Feb. 2010, 5 pages.
3GPP TR 36.913 V9.0.0, "3rd Generation Partnership Project; Technical Specification Group Radio Access Network; Requirements for further advancements for Evolved Universal Terrestrial Radio Access (E-UTRA) (LTE-Advanced) (Release 9)", Dec. 2009, 15 pages.
3GPP TS 36.300 V8.11.0, "Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Dec. 2009, 148 pages.
3GPP TS 36.420 V9.0.0, "3rd Generation Partnership Project; Technical Specification Group Radio Access Network; Evolved Universal Terrestrial Radio Access Network (E-UTRAN); X2 general aspects and principles (Release 9)", Dec. 2009, 12 pages.
3GPP TS 36.423 V9.4.0, "3rd Generation Partnership Project; Technical Specification Group Radio Access Network; Evolved Universal Terrestrial Radio Access Network (E-UTRAN); X2 application protocol (X2AP) (Release 9)", Sep. 2010, 121 pages.
Nokia Siemens Networks et al., 3GPP TSG-RAN WG1 Meeting #60, R1-101431, "CoMP performance evaluation", San Francisco, USA, Feb. 22-26, 2010, 7 pages.
3GPP TS 36.212 V9.2.0, "3rd Generation Partnership Project; Technical Specification Group Radio Access Network; Evolved Universal Terrestrial Radio Access (E-UTRA); Multiplexing and channel coding (Release 9)", Jun. 2010, 61 pages.
3GPP TR 36.912 V9.2.0, "3rd Generation Partnership Project; Technical Specification Group Radio Access Network; Feasibility study for Further Advancements for E-UTRA (LTE-Advanced) (Release 9)", Mar. 2010, 61 pages.
Qualcomm Europe, 3GPP TSG-RAN WG1 #57, R1-092057, "Signaling for spatial coordination in DL CoMP", May 2009, San Francisco, USA, 10 pages.
3GPP TS 36.300 V9.3.0 (Mar. 2010), Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9), 166 pages.
3GPP TS 26.234 V11.0.0 (Mar. 2012); 3rd Generation Partnership Project; Technical Specification Group Services and System Aspects; Transparent end-to-end Packet-switched Streaming Service (PSS); Protocols and codecs (Release 11) (169 pages).
ETSI TS 126 233 V8.0.0 (Jan. 2009); Universal Mobile Telecommunications System (UMTS); LTE; End-to-end transparent streamin service; General description (3GPP TS 26.233 version 8.0.0 Release 8) (16 pages).

* cited by examiner

WITH NO PRE-FILLING

WITH PRE-FILLING

GENERATING SHORT TERM BASE STATION UTILIZATION ESTIMATES FOR WIRELESS NETWORKS

TECHNICAL FIELD

The teachings in accordance with the exemplary embodiments of this invention relate generally to wireless communication devices, methods, and computer program products and, more specifically, to enhancing user experience by generating short-term base station utilization estimates for wireless networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
ACK acknowledgement
AWT alternate wireless technology
BE best effort
BTS base transceiver station
CAN-EG content aware network-enabling gateway
CDN content distribution network
CEM customer experience management
CN core network
DL downlink (from base station to user equipment)
DPI deep packet inspection
eNode B evolved Node B (LTE base station)
E-UTRAN evolved UTRAN
eNB evolved Node B (LTE base station)
EPC evolved packet core
GBR guaranteed bit-rate
GGSN gateway GPRS support node
GPRS general packet radio service
GPS global positioning system
GTP GPRS tunneling protocol
HLR home location register
HO handover
HSS home subscriber server
HTML hypertext markup language
HTTP hypertext transfer protocol
IP interne protocol
IP-CAN IP connectivity access network
LTE long term evolution
MAC media access control
MCN mobile network code
MME mobility management entity
MNO mobile network operator
MO media optimizer
Node B (NB) Node B (base station in UTRAN)
NBG NSN browsing gateway
NSN Nokia Siemens Networks
PCEF policy and charging enforcement function
PCRF policy and charging rules function
PDF policy decision function
PDN packet data network
PDN-GW packet data network-gateway
PRB physical resource block
QoE quality of experience
QoS quality of service
RAN radio access network
RNC radio network controller
RSM radio system module
SGSN serving GPRS support node
TCP/IP transmission control protocol/internet protocol
UE user equipment
UL uplink (from UE to base station)
UMTS universal mobile telecommunications system
URL uniform resource locator
UTRAN universal terrestrial radio access network
VLR visitor location register Utilization of base stations and evolved node Bs (eNBs) is an important metric for driving a number of different customer experience management (CEM) and application optimizations. Prefetching or prefilling of media content may occur while media is being played or rendered on a media presentation device. This prefetching or prefilling may utilize the approximately 40% of physical resource blocks (PRBs) across systems which currently goes to waste and is not deducted from a user's monthly data bucket. The progress of the prefilling process may be displayed on the device in the form of a status bar indicating an amount or portion of buffer content that has been downloaded but not yet displayed. In addition to or in lieu of video prefilling, prefetching of social media objects may be performed. The status bar may provide a relative indication of the amount of prefill and/or prefetching that has been performed by highlighting a section of the status bar that is after or to the right of a moving arrow or cursor which represents the currently rendered portion of the media. The media may include video, audio, social media objects, or any of various combinations thereof.

Prefilling and prefetching benefits the overall user experience when downloading and playing media because the buffered data compensates for momentary drop-outs, network congestion, and coverage gaps. Improved capacity may be provided by allowing prefetching and/or prefilling when there is less loading in the wireless system. Prefilled users can stop prefilling when loading spikes, peaks or increases. With prefilling, media playout can continue even when the user leaves the coverage area of the base station or eNB. Prefilling also provides higher data user rates. Users are able to "fast forward" through media more quickly. Prefilling may increase the feasibility of providing wireless video telephony which is currently banned from cellular networks. In addition, the selection of media object duration, video content, and levels of gaming difficulty may be based upon cell loading. However, prefilling and prefetching may load an evolved packet core (EPC), as well as the eNB associated therewith, with many signaling procedures relative to the number of user bytes being transferred.

If eNB utilization information is delayed, the wireless system may not function efficiently. Prefilling may not sufficiently take into account a current physical resource block (PRB) utilization of a cell/eNB carrying the bearer providing the media signaling which is being prefilled. Further, an explicit indication from a network device such as a base station indicating when the cell becomes under or over loaded may be too slow to enable the full benefits of this prefill mechanism to be utilized. For example, during the time interval when the system becomes less loaded, a controller associated with a prefill signal, such as in a base station or media optimizer, may continue to operate as if the system is still more loaded. Thus, there is a problem in that the controller will miss the opportunity to perform additional prefilling. Similarly, during the time interval when the system becomes more loaded, the controller may continue to operate as if the system is less loaded. In this situation, prefilling video users may consume extra system capacity which otherwise would not be "wasted" on prefilling. Thus, for at least these reasons the benefits of prefilling for the user or the operator will be effectively mitigated. At the same time, from an eNB processing perspective, it is rather expensive for the eNB to generate estimates of the eNB utilization on a short/frequent time scale. Further, these estimates can be calculated or determined only after observations have been conducted over the air, and then after some messaging delay.

SUMMARY

In an exemplary aspect of the invention, there is a method comprising monitoring within a network a history of bits throughput to a base station over each of a plurality of time intervals, monitoring within the network a physical resource block utilization level over each of the plurality of time intervals, determining a ratio of the history of bits to the utilization level for each of the plurality of time intervals, determining an updated history of bits for each of a plurality of upcoming time intervals, estimating an updated utilization level in response to the updated history of bits and the ratio, generating messaging to at least one additional network element conveying the estimated updated physical resource block utilization level, and adjusting at least one of a prefilling process or a prefetching process in response to the updated utilization level.

In another exemplary aspect of the invention, there is an apparatus comprising at least one processor, and at least one memory including computer program code, where the at least one memory and the computer program code are configured, with the at least one processor, to cause the apparatus to at least monitor within a network a history of bits throughput to a base station over each of a plurality of time intervals, monitor within the network a physical resource block utilization level over each of the plurality of time intervals, determine a ratio of the history of bits to the utilization level for each of the plurality of time intervals, determine an updated history of bits for each of a plurality of upcoming time intervals, estimate an updated utilization level in response to the updated history of bits and the ratio, generate messaging to at least one additional network element conveying the estimated updated physical resource block utilization level, and adjust at least one of a prefilling process or a prefetching process in response to the updated utilization level.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The teachings in accordance with the exemplary embodiments of this invention relate to improving the experience of user equipment (UE) users by generating short-term base station utilization estimates for wireless networks to control prefilling and prefetching of media in a dynamic manner. Illustratively, control of prefilling and prefetching may be facilitated through the use of an application aware network element such as an application optimizer device or another device providing download and/or streaming optimization services. The application aware network element can provide metrics to authorized applications and services based on policy rules to facilitate service level agreement compliance or quality of service (QOS) requirements.

Figure 1A:
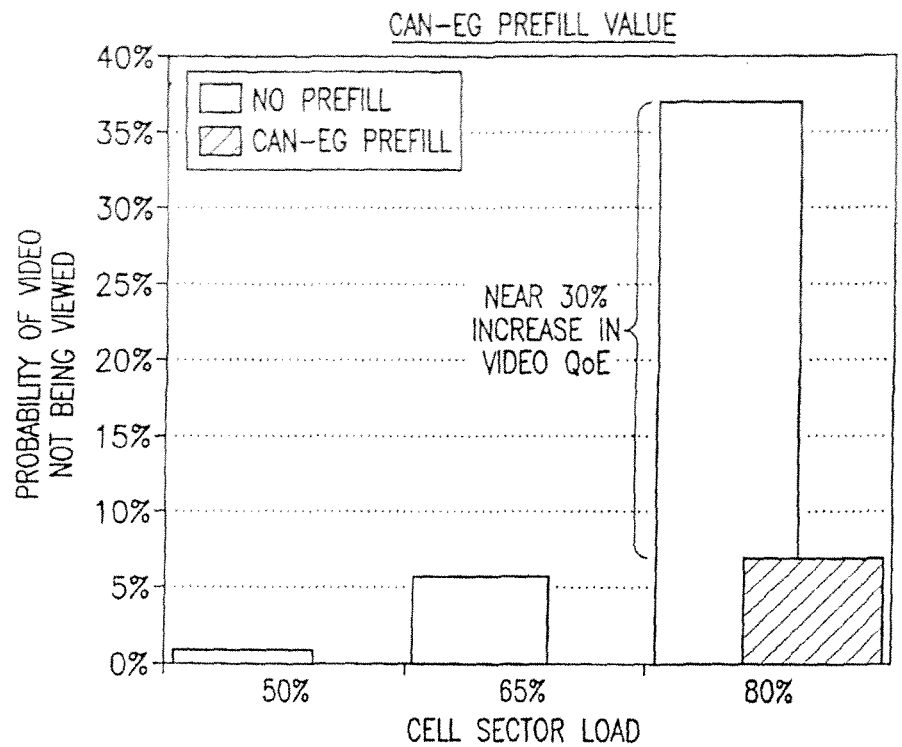
FIG. 1A is a bar graph showing some illustrative benefits of video prefilling.

As illustrated in FIG. 1A, the probability of a video being continuously viewed without video freezing is 30% higher with optimized/controlled prefill than without the optimized/controlled prefill. Media or video prefill improves user experience. According to a set of illustrative embodiments of the invention, resources that were wasted using conventional approaches may now be used for prefilling. In addition, with prefilling a user experience is improved as prefilled video users can stop prefilling (and play higher quality video) when there is a loading spike, can continue play-out when going in and out of a coverage area, and can more quickly fast forward.

Figure 1B:
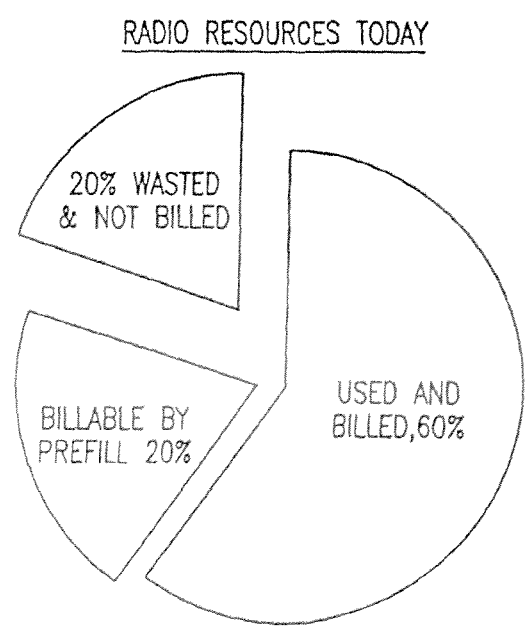
FIG. 1B is a pie chart showing exemplary radio resource utilization for performing video prefilling.
Figure 1C:
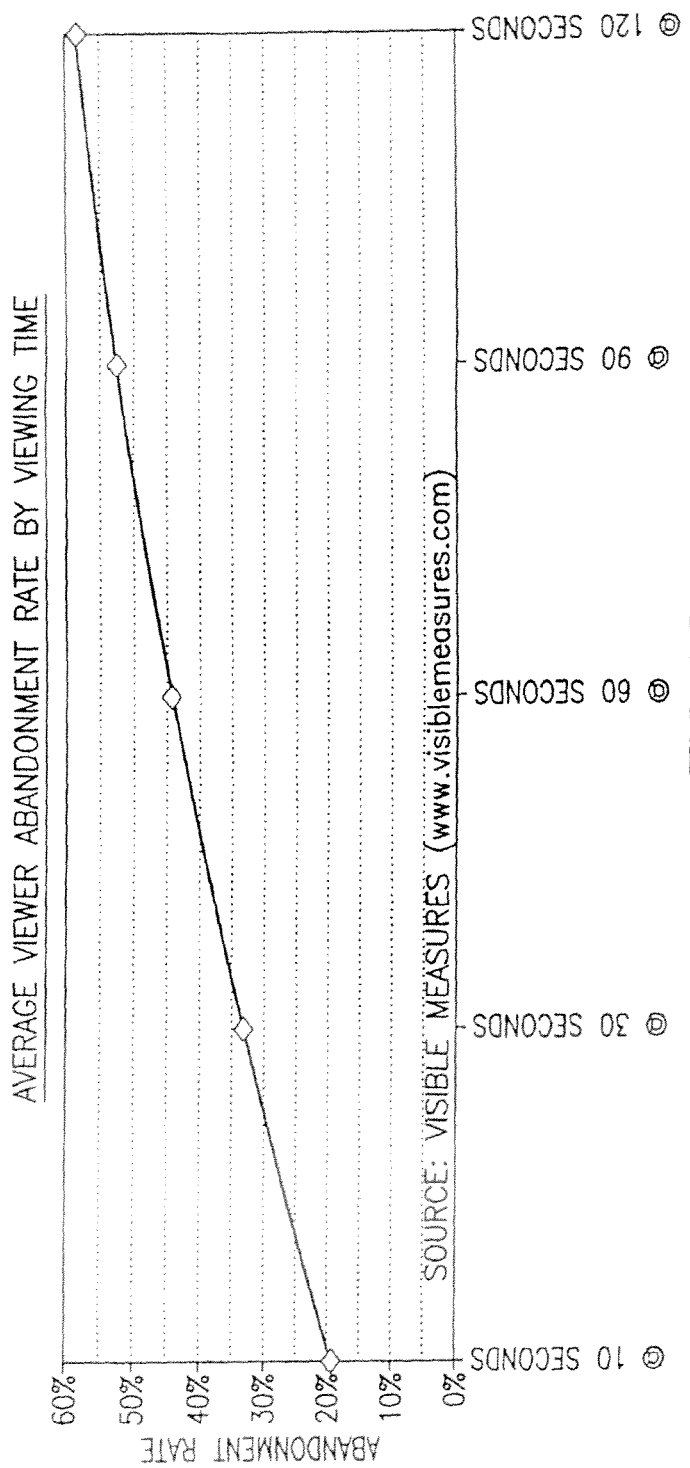
FIG. 1C is a graph that illustrates an average viewer abandonment rate as a function of viewing time.

FIG. 1B is a pie chart illustrating the manner in which network operators may benefit from a set of exemplary embodiments of the invention disclosed herein. By controlling the prefilling and prefetching processes based on eNB utilization estimates, there is a 30% increase in billable resources using prefills (30%~20%/60%). In other words, using prefill, a network operator's billable usage can increase by approximately 30% based on revenue for resources that would have otherwise been wasted. Further, FIG. 1C illustrates that the average abandonment viewer rate increases from 20% at ten seconds' waiting time to almost 60% at 120 seconds' waiting time.

Figure 2:
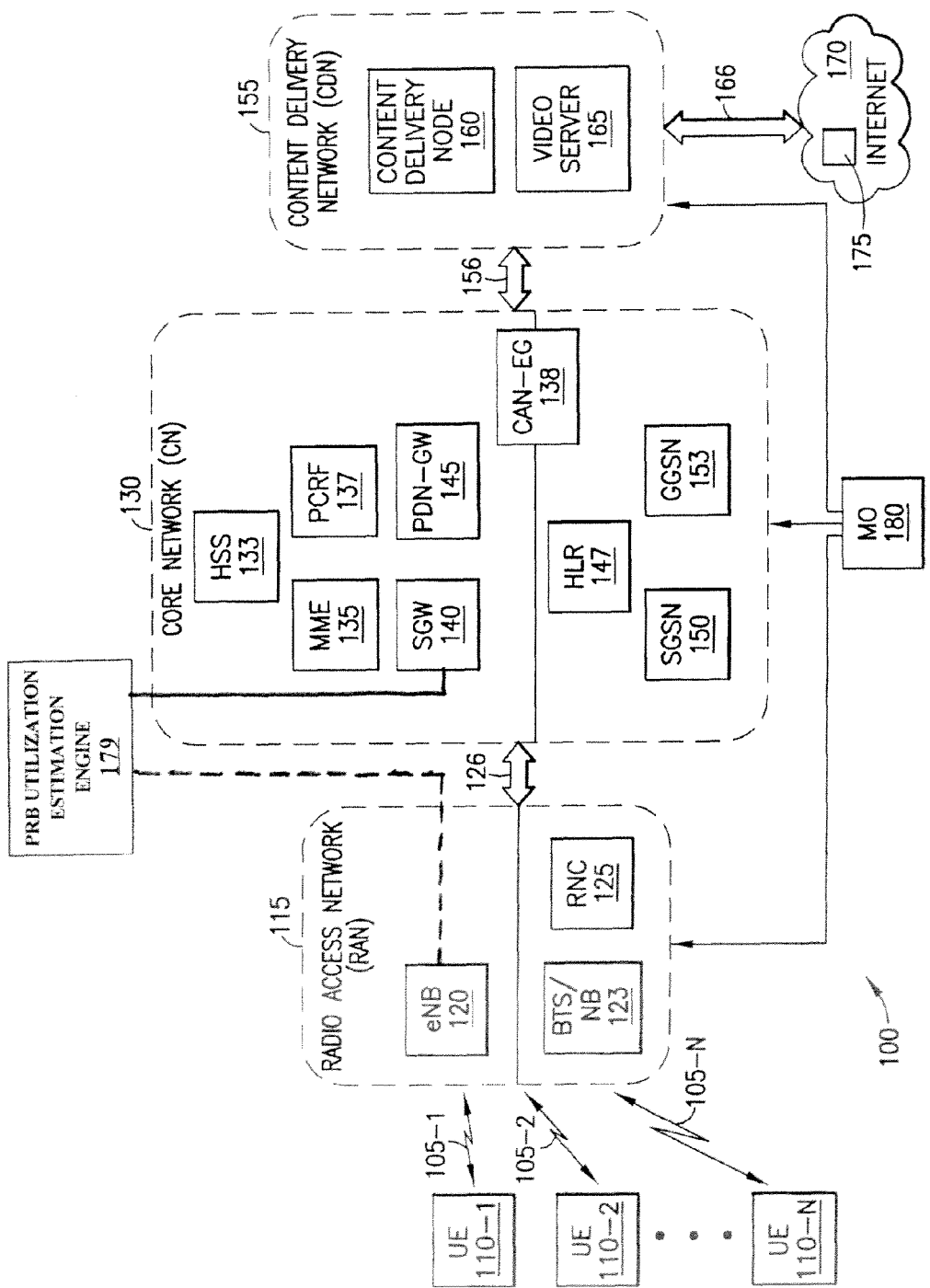
FIG. 2 is a simplified block diagram of an illustrative system in which a set of exemplary embodiments of the instant invention may be used.

FIG. 2 is a simplified block diagram of an illustrative system in which a set of exemplary embodiments of the instant invention may be used. The system of FIG. 2 represents one illustrative example of a server radio access network (RAN) interfaced architecture for, e.g., a macro cell. The architecture shows N user equipments 110-1 through 110-N communicating via a corresponding wireless connection 105-1 through 105-N (including uplink and downlink) to a network 100. The network 100 includes a RAN 115, a core network (CN) 130, and a content delivery network (CDN) 155. The CDN 155 is connected to the Internet 170 via one or more links 166. The RAN 115 is connected to the CN 130 via one or more links 126. The CN 130 is connected to the CDN 155 via one or more links 156.

In a E-UTRAN embodiment, the RAN 115 includes an eNB (evolved Node B, also called E-UTRAN Node B) 120, and the CN 130 includes a home subscriber server (HSS) 133, a serving gateway (SGW) 140, a mobility management entity (MME) 135, an optional policy and charging rules function (PCRF) 137, and a packet data network gateway (PDN-GW) 145. E-UTRAN is also called long term evolution (LTE). The one or more links 126 may implement an S1 interface.

In a UTRAN embodiment, the RAN 115 includes a base transfer station (BTS) (Node B) 123, and a radio network controller 125, and the CN 130 includes a serving GPRS support node (SGSN) 150, a home location register (HLR)

147), and a gateway GPRS support node (GGSN) 153. The one or more links 126 may implement an Iu interface.

An optional content area network enabling gateway (CAN-EG) 138 may be part of either EUTRAN or UTRAN and is a network entity that enables the alignment of the network resources (such as bandwidth required, Quality of Service, type of bearer (best-effort, guaranteed, non-guaranteed, dedicated)), with the needs of the service and alignment of these resources through the session.

The CDN 155 includes a content delivery node 160 and a video server 165, which may also be combined into one single node. The content delivery node 160 may provide a cache of information on the Internet 170. The video server 165 may provide a cache of video, e.g., at different compression rates and/or resolutions.

The examples above indicate some possible elements within the RAN 115, CN 130, and CDN 155 but are not exhaustive, nor are the shown elements necessary for the particular embodiments. Furthermore, the instant invention may be used in other systems, such as CDMA (code division multiple access) and LTE-A (LIE-advanced).

In this example, one or more of the user equipment 110 connects to the content source 175 in the Internet 170 to download video via, e.g., a service entity such as a media optimizer (MO) 180, CDN 160 or video server 165. The video server 165 in this example is a cache video server, meaning that the video server 165 has a cached copy of video stored on the content source 175. The content source 175 may be an origin server, which means the content source 175 is the original video source (e.g. as opposed to a video server 165 having cached content). The MO 180 may be implemented in the RAN 115, the CN 130, and/or the CDN 155. Optimized content is streamed from the MO 180 or video server 165 to the PDN-GW 145/GGSN 153, which forwards the content to the SGW 140/SGSN 150 and finally through the eNodeB 120/NB 123 to the UE 110. If the video server(s) 165 are used, the servers are considered surrogate servers, since these servers 165 contain cached copies of the videos in content sources 175.

The video contained in one or more video streams between elements in the wireless network 100 is carried over the wireless network 100 using hypertext markup language (HTML). The videos are requested by user equipment 110 through a series of separate uniform resource locators (URLs), each URL corresponding to a different video stream of the one or more video streams.

Illustratively, the optional PCRF 137 could, but need not, be utilized to control prefilling of media over hypertext markup language signaling at the user equipment 110. PCRF 137 is part of an IP multimedia subsystem (IMS) architecture that works across wireless networks and may be-integrated into a network device such as an information technology server. PCRF 137 is often referred to as a policy server or—formerly—a policy decision function (PDF), PCRF 137 defines and provides the policy and charging rules that are used in the policy enforcement points for policy control and flow-based charging control at different network devices, PCRF 137 has been developed for the 3GPP Release 7 and it combines the charging rules with the policy decision function of earlier 3GPP architecture releases. PCRF 137 can maintain IP-CAN sessions associated with users.

An optional policy and charging enforcement function (PCEF) (not shown) is a function that receives the policy and charging rules from PCRF 137, detects traffic, and enforces the rules for classifying the traffic on service data flows. The control for the quality of service (QoS) is applied per service data flow in the PCEF. The PCEF can be co-located in a packet data network (PDN) gateway. PCRF 137 may interface with the main packet gateway and take charging enforcement decisions on its behalf. The centralized device can act as a policy decision point (PDP) for the wireless operator and may perform on a level as granular as individual subscribers. For example, service providers can use PCRF 137 to charge subscribers based on their volume of usage of high-bandwidth applications, charge extra for QoS guarantees, and limit application usage while a user is roaming, or lower the bandwidth of wireless subscribers using heavy-bandwidth apps during times of peak usage.

A QoS authorization process includes a derivation of parameters such as Authorized QoS Class Identifier (QCI) and Authorized Maximum/Guaranteed Data Rate UL/DL. When a session is initiated or modified, the PCRF 137 derives Authorized IP QoS parameters (e.g. QCI, Authorized Maximum/Guaranteed Data Rate, priority DL/UL) from the service information. If the selected Bearer Control Mode (BCM) is UE-only this process is performed according to the mapping rules to avoid undesired misalignments with user equipment QoS parameters mapping. Each Authorized IP QoS Parameter may be set to the highest value requested for the IP flow(s) of that media component by any of the active forked responses. Mapping rules may be created or changed taking into account link speed and/or media signal compression for the media over hypertext markup language signaling at the user equipment.

A set of exemplary embodiments of the invention provide improved media optimization taking into account eNB 120 utilization. In addition to eNB 120 utilization increased levels of other cell interference can further influence the degree of prefilling. For example increased levels of other cell interference can reduce the number of available physical resource blocks, thereby increasing the percent of available physical resource blocks which are calculated as utilized. Additionally, the prefill may be throttled based on the eNB 120 utilization on both the uplink and downlink, based on utilization over the back-haul, and based on CPU loading at the eNB 120.

At the eNB 120, decreasing at least one of a priority level and a guaranteed bit rate enables the eNB 120 scheduling algorithm to defer to an even greater degree, prefill which is associated with a mobile where there is a greater level of interference. In other words if a particular prefilling mobile/eNB 120 is (temporarily) generating particularly large levels of interference, then the scheduler will then preferably provide that UE with an even lower data rates and some other prefilling mobile in the same cell which is generating less interference.

One distinction between the eNB 120 and the SGW 140 is that the eNB 120 largely always knows a very accurate estimate of physical resource block (PRB) utilization. The SGW 140 may observe the volume of bytes more frequently, but the SGW 140 receives less frequent messaging from the eNB 120 to inform the SGW 140 of recent PRB utilization. A physical resource block (PRB) utilization estimation engine 179 monitors various reports coming out of different network elements of the core network 130. The PRB utilization estimation engine 179 is linked to the SGW 140 (wherein the SGW 140 has the opportunity to know the volumes of traffic going to and from a particular eNB 120). Optionally, the PRB utilization estimation engine 179 is also linked to the eNB 120 by which the engine can retrieve less frequent PRB utilization reports. It may be that the PRB utilization reports actually go from the eNB 120 up through an OAM system (not shown), before eventually going up to the PRB utilization estimation engine 179.

Figure 3A:
FIGS. 3A, 3B, and 3C are exemplary screen captures illustrating media over hypertext markup language signaling with and without prefilling.
Figure 3A:
Figure 3C:
Figure 3C:
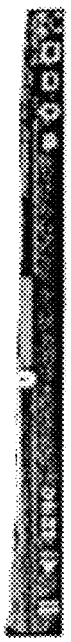
Figure 3B:
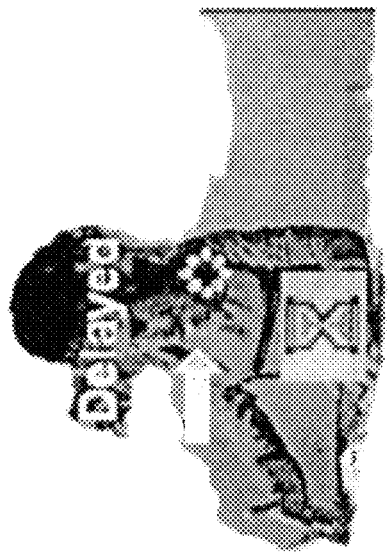
Figure 3B:

Referring now to FIG. 3A, an arrow 30 shows a prefill area at the bottom of the video. The prefill area follows a play indicator circle and prefill area indicates the media received which has not yet been played. The video display window and the prefill area on part of an HTML type display. FIG. 3B illustrates an exemplary display of video with no pre-filling, whereas FIG. 3C illustrates an exemplary display of video with pre-filling. More specifically, FIG. 3B shows an HTTP display of media over hypertext markup language that does not use pre-filling and, as such, there is no prefill area at the bottom of the display. Thus, in this case any change in the media signal throughput can cause a delayed video, as indicated by the hour glass. This type of video stream can be considered a "just in time" video stream. By contrast, FIG. 3C illustrates a media over hypertext markup language using prefill with the prefill area shown at the bottom of the display. The advantages of the prefilling, as in FIG. 3C, can benefit the user experience by eliminating or reducing delay of the played media signal.

Figure 4:
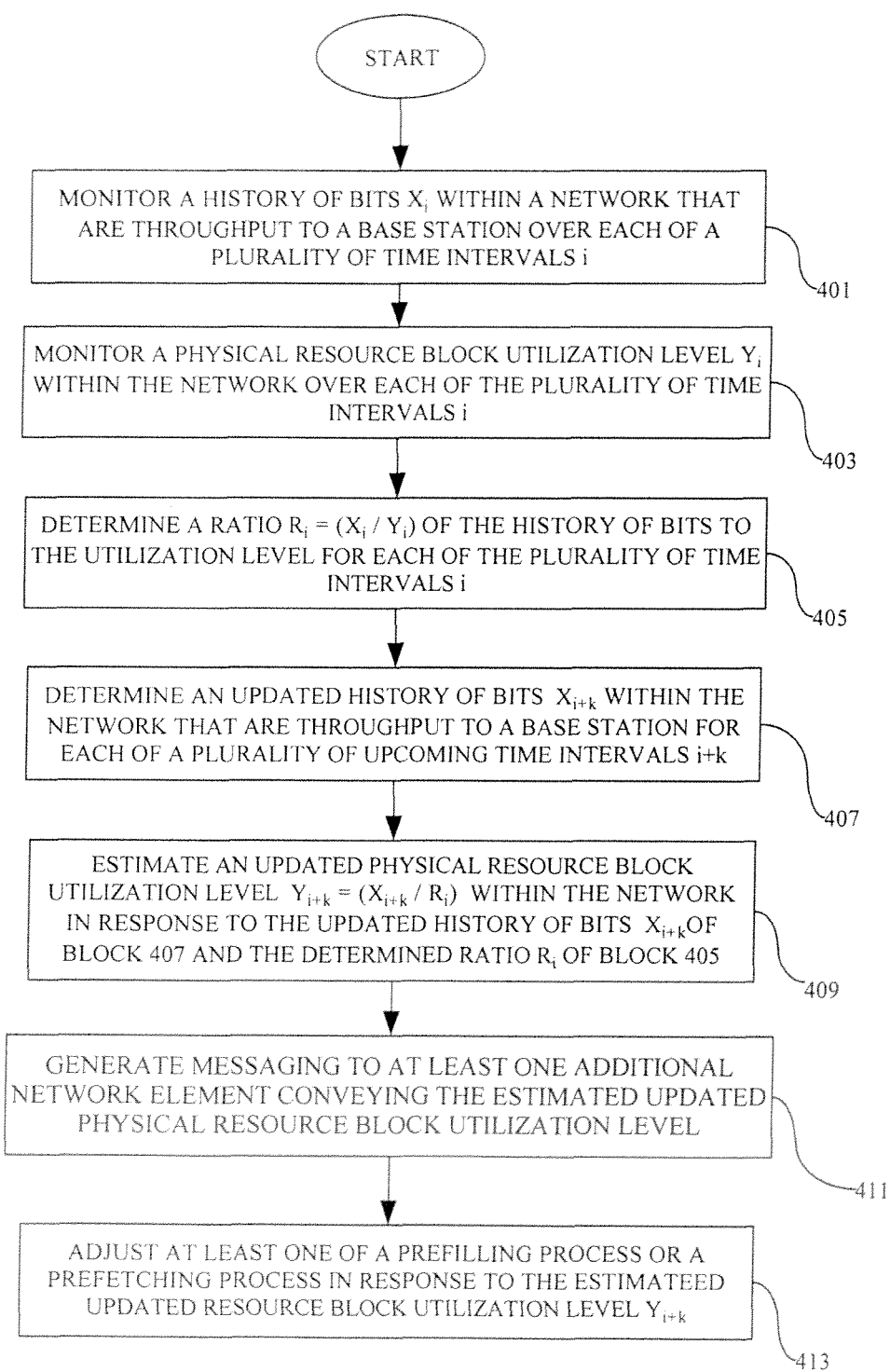
FIG. 4 is a simplified block diagram illustrating a method for generating short-term base station utilization estimates for wireless networks in accordance with a set of exemplary embodiments of the invention.

FIG. 4 is a simplified block diagram illustrating a method for generating short-term base station utilization estimates for wireless networks in accordance with a set of exemplary embodiments of the invention. At block 401, a history of bits $X_i$ throughput to a base station is monitored within a network over each of a plurality of time intervals denoted as i. Next, at block 403, a physical resource block utilization level $Y_i$ within the network is monitored over each of the plurality of time intervals i. Illustratively, the physical resource block (PRB) utilization level Y, may be determined with reference to a set of equations presented in LTE 36.314 which define physical resource block usage. Section 4.1.1.3 of LTE 36.314 describes physical resource block usage per traffic class.

A ratio $R_i=(X_i/Y_i)$ of the history of bits to the utilization level is determined for each of the plurality of time intervals i (block 405). An updated history of bits $X_{i+k}$ is determined for each of a plurality of upcoming time intervals i+k (block 407). An updated physical resource block utilization level $Y_{i+k}=(X_{i+k}/R_i)$ is estimated in response to the updated history of bits $X_{i+k}$ and the ratio $R_i$ (block 409). At block 411, messaging is generated to at least one additional network element conveying the estimated updated physical resource block utilization level. At least one of a prefilling process or a prefetching process is adjusted in response to the estimated updated utilization level $Y_{i+k}$ (block 413).

Optionally, if the variance of the ratio $R_i=(X_i/Y_i)$ of the history of bits to the utilization level is less than a first or lower threshold, then the eNB or base station reporting of the estimated updated physical resource block utilization level $Y_{i+k}=(X_{i+k}/R_i)$ is performed less frequently. On the other hand, if the variance of the ratio $R_i=(X_i/Y_i)$ of the history of bits to the utilization level is greater than a first or higher threshold, then the eNB or base station reporting of the estimated updated physical resource block utilization level $Y_{i+k}=(X_{i+k}/R_i)$ is performed more frequently, Note that, if $R_i$ is fairly consistent throughout many successive time intervals i+k, then $R_i$ is said to have a small variance and the estimated physical resource block utilization level $Y_{i+k}$ is expected to be particularly accurate, Illustratively, the network element performing the estimating step (block 409 of FIG. 4) is a serving gateway. The network element performing the estimating step may also perform messaging to inform the CEM or application optimization engine of the eNB or base station utilization metric $Y_{i+k}$.

The method of FIG. 4 addresses situations where the efficiency of a wireless system would otherwise be degraded due to eNB utilization information being delayed. This method enables prefilling to take into account the link speed and the loading of the cell/eNB carrying the bearer providing the media signaling which is being prefilled. Illustratively, the method may be advantageously employed in situations where an explicit indication from a network device such as a base station indicating when the cell becomes under or over loaded is too slow to enable the full benefits of the prefill mechanism to be utilized.

For example, during the time interval when the system becomes less loaded, a controller associated with a prefill signal, such as in a base station or media optimizer, may continue to operate as if the system is still more loaded. Thus, the method of FIG. 4 addresses inefficiencies wherein the controller would otherwise miss the opportunity to perform additional prefilling. Similarly, during the time interval when the system becomes more loaded, the method of FIG. 4 addresses inefficiencies wherein the controller would otherwise continue to operate as if the system is less loaded. In the latter situation, prefilling video users may consume extra system capacity which otherwise would not be "wasted" on prefilling. Thus, the method of FIG. 4 enhances the benefits of prefilling for the user as well as the network operator.

The method of FIG. 4 enables a communications network or core to create application optimization algorithms without having to receive frequent physical resource block utilization updates from the eNB or base station. The estimate of block 409 is generated from within a core network (such as wireless communication network 1 of FIG. 2) based upon the most recently observed traffic going down to the eNB for delivery on the downlink. In this manner, it is possible to outperform the physical resource block utilization metric by being able to anticipate a spike, peak or increase in the physical resource block utilization before the spike, peak or increase actually occurs. Additionally, the procedure of FIG. 4 reduces the amount of eNB signaling required in order to estimate the physical resource block utilization on a very short time interval. Having knowledge of the physical resource block utilization time interval generates significant benefits through the eNB utilization-driven prefill use case described herein.

In accordance with a set of exemplary embodiments of the invention, the history of bits may comprise bits that represent at least one of video over HTML, Apple Live Stream, Microsoft Smooth Stream. HTTP adaptive streaming, and progressive downloaded video.

In addition, according to a set of exemplary embodiments of the invention, the method as shown in FIG. 4 may be performed by an apparatus comprising at least one processor, and at least one computer readable memory embodying at least one computer program code, where the at least one computer readable memory embodying the at least one computer program code is configured, with the at least one processor to perform the method of FIG. 4. For example, the method of FIG. 4 may, but need not, be performed using any of the devices and apparatuses shown in FIG. 2.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software are tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    monitoring within a network over each of a first plurality of time intervals a history of bits throughput to a base station used for communication with at least one user equipment;
    monitoring within the network a physical resource block utilization level over each of the plurality of time intervals;
    determining a ratio of the history of bits to the physical resource block utilization level for each of the plurality of time intervals;
    determining an updated history of bits for each of a second plurality of time intervals that are all subsequent to the first plurality of time intervals;
    estimating an updated physical resource block utilization level using the updated history of bits and the ratio;
    generating messaging to at least one additional network element conveying the estimated updated physical resource block utilization level; and
    adjusting at least one of a prefilling process and a prefetching process of data communicated to the at least one user equipment using the estimated updated physical resource block utilization level.

2. The method of claim 1 wherein the second time interval comprises an upcoming time interval wherein a plurality of bits are flowing in a downlink direction, and the method further comprises monitoring the plurality of bits prior to the bits arriving at the base station.

3. The method of claim 1 further comprising reporting the estimated updated physical resource block utilization level to a base station or eNB.

4. The method of claim 3 wherein, in response to a variance of the ratio of the history of bits to the physical resource block utilization level being less than a first or lower threshold, then performing the reporting of the estimated updated physical resource block utilization level on a less frequent basis.

5. The method of claim 3 wherein, in response to the variance of the ratio of the history of bits to the physical resource block utilization level being greater than a first or higher threshold, then performing the reporting of the estimated updated physical resource block utilization level on a more frequent basis.

6. The method of claim 1 wherein the estimating is performed using a serving gateway.

7. The method of claim 6 wherein the serving gateway reports the estimated updated physical resource block utilization level to a base station or eNB by performing messaging to a customer experience management application or application optimization engine.

8. The method according to claim 7, wherein the messaging comprises an indication of a prefill level within a TCP/IP acknowledgment.

9. The method according to claim 7, wherein the messaging comprises a uniform resource locator encoding a prefill level.

10. The method of claim 1, wherein the network comprises at least one of a media optimizer device, a video server, a content distribution device and a radio system module.

11. The method according to claim 10, wherein the bits throughput to the base station are sent using long term evolution air interface signaling.

12. A memory embodying computer program code, the computer program code executed by at least one processor to perform the method according to claim 1.

13. An apparatus comprising at least one processor; and at least one memory including computer program code, wherein the at least one memory and the computer program code are configured, with the at least one processor, to cause the apparatus to at least:
    monitor within a network over each of a first plurality of time intervals a history of bits throughput to a base station used for communication with at least one user equipment;
    monitor within the network a physical resource block utilization level over each of the plurality of time intervals;
    determine a ratio of the history of bits to the physical resource block utilization level for each of the plurality of time intervals;
    determine an updated history of bits for each of a plurality of upcoming time intervals;
    estimate an updated physical resource block utilization level using to the updated history of bits and the ratio;
    generate messaging to at least one additional network element conveying the estimated updated physical resource block utilization level; and
    adjust at least one of a prefilling process and a prefetching process of data communicated to the at least one user equipment using the estimated updated physical resource block utilization level.

14. The apparatus of claim 13 wherein the second time interval comprises an upcoming time interval wherein a plurality of bits are flowing in a downlink direction, and the wherein the at least one memory including computer program code is further configured with the at least one processor to cause the apparatus to monitor the plurality of bits prior to the bits arriving at the base station.

15. The apparatus of claim 13 wherein the at least one memory including computer program code is further configured with the at least one processor to cause the apparatus to report the estimated updated physical resource block utilization level to a base station or eNB.

16. The apparatus of claim 15 wherein the at least one memory including computer program code is further configured with the at least one processor to cause the apparatus to perform the reporting of the estimated updated physical resource block utilization level on a less frequent basis in response to a variance of the ratio of the history of bits to the physical resource block utilization level being less than a first or lower threshold.

17. The apparatus of claim 15 wherein the at least one memory including computer program code is further configured with the at least one processor to cause the apparatus to perform the reporting of the estimated updated physical resource block utilization level on a more frequent basis in response to a variance of the ratio of the history of bits to the physical resource block utilization level being greater than a second or higher threshold.

18. The apparatus of claim 17 wherein the serving gateway reports the estimated updated physical resource block utilization level to a base station or eNB by performing messaging to a customer experience management application or application optimization engine.

19. The apparatus of claim 13 wherein the apparatus comprises a serving gateway.

20. The apparatus according to claim 19, wherein the messaging comprises an indication of a prefill level within a TCP/IP acknowledgment.

21. The apparatus according to claim 19, wherein the messaging comprises a uniform resource locator encoding a prefill level.

22. The apparatus of claim 13, wherein the network comprises at least one of a media optimizer device, a video server, a content distribution device and a radio system module.

23. The apparatus according to claim 13, wherein the bits throughput to the base station are sent using long term evolution air interface signaling.

* * * * *

UNITED STATES PATENT AND TRADEMARK OFFICE
CERTIFICATE OF CORRECTION

PATENT NO. : 9,019,858 B2
APPLICATION NO. : 13/774123
DATED : April 28, 2015
INVENTOR(S) : Harris et al.

Page 1 of 1

It is certified that error appears in the above-identified patent and that said Letters Patent is hereby corrected as shown below:

In the Claims,

Claim 13, col. 10, line 55 "to" should be deleted in between "using" and "the".

Signed and Sealed this
Thirtieth Day of June, 2015

Michelle K. Lee
*Director of the United States Patent and Trademark Office*